United States Patent
Schmidtberg et al.

(10) Patent No.: US 7,484,662 B2
(45) Date of Patent: Feb. 3, 2009

(54) RECORDING OF LOCATION EVENT INFORMATION IN RFID TAGS

(75) Inventors: Rupert A. Schmidtberg, Westford, MA (US); Timothy J. Wile, Rockport, MA (US)

(73) Assignee: Sensitech Inc., Beverly, MA (US)

( * ) Notice: Subject to any disclaimer, the term of this patent is extended or adjusted under 35 U.S.C. 154(b) by 640 days.

(21) Appl. No.: 11/112,960

(22) Filed: Apr. 22, 2005

(65) Prior Publication Data

US 2005/0236479 A1  Oct. 27, 2005

Related U.S. Application Data (60) Provisional application No. 60/564,447, filed on Apr. 22, 2004, provisional application No. 60/564,402, filed on Apr. 22, 2004.

(51) Int. Cl.
*G06K 5/00* (2006.01)
(52) U.S. Cl. .................................. 235/385; 235/383
(58) Field of Classification Search ................ 235/385, 235/380, 383, 382, 462.13, 462.46, 472
See application file for complete search history.

(56) References Cited

U.S. PATENT DOCUMENTS

| | | | |
|---|---|---|---|
| 5,627,517 A | 5/1997 | Theimer et al. | |
| 5,686,888 A | 11/1997 | Welles, II et al. | |
| 5,960,408 A | 9/1999 | Martin et al. | |
| 6,208,253 B1 | 3/2001 | Fletcher et al. | |
| 6,246,882 B1 | 6/2001 | LaChance | |
| 6,335,685 B1 | 1/2002 | Schrott et al. | |
| 6,539,360 B1 | 3/2003 | Kadaba | |
| 6,600,418 B2 * | 7/2003 | Francis et al. | 340/572.1 |
| 6,750,765 B1 | 6/2004 | Van Wijk | |
| 6,901,304 B2 * | 5/2005 | Swan et al. | 700/115 |
| 6,972,682 B2 * | 12/2005 | Lareau et al. | 340/568.1 |
| 7,142,110 B2 * | 11/2006 | Schmidtberg et al. | 340/539.27 |
| 2002/0082787 A1 | 6/2002 | Woodsworth et al. | |
| 2002/0099567 A1 | 7/2002 | Joao | |
| 2004/0027243 A1 | 2/2004 | Carrender | |
| 2004/0036595 A1 | 2/2004 | Kenny et al. | |
| 2004/0069850 A1 | 4/2004 | De Wilde | |
| 2004/0243353 A1 | 12/2004 | Aghassipour | |

* cited by examiner

*Primary Examiner*—Daniel St. Cyr
(74) *Attorney, Agent, or Firm*—Kinney & Lange, P.A.

(57) ABSTRACT

The present invention is directed to novel systems and methods for transmitting location event information to and/or from an electronic device, such as a radio frequency identification (RFID) tag, from and/or to one or more location ID stations. Among other things, a method is disclosed that involves wirelessly receiving at least one signal at an electronic device associated with a package as the package is transported from a source location to a destination location in a manufacturing process, supply chain, and/or distribution network, the at least one signal including location event information that is sufficient to specify a location of the package at a time the at least one signal is received. The method further involves, based upon the at least one signal, storing data representative of the location event information in memory of the electronic device so that the location of the package identified by the at least one signal can be subsequently ascertained by retrieving and analyzing the data.

41 Claims, 6 Drawing Sheets

Fig. 8 ic # RECORDING OF LOCATION EVENT INFORMATION IN RFID TAGS

CROSS-REFERENCE TO RELATED APPLICATIONS

This application claims the benefit, under 35 U.S.C. § 119(e), of the filing date of each of U.S. provisional application Ser. No. 60/564,447 entitled "Recording of Location Event Information in RFID Tags," filed Apr. 22, 2004, and U.S. provisional application Ser. No. 60/564,402 entitled "Pedigree and Integrity Evaluation of Packages," filed Apr. 22, 2004. Each of the foregoing applications is hereby incorporated herein by reference in its entirety.

FIELD OF INVENTION

The present invention relates generally to methods and apparatuses that may be used to communicate and store location event information relating to a transported item. In some embodiments, such information is wirelessly communicated from one or more location ID stations to a radio frequency identification (RFID) tag associated with the item so that the tag may keep a record of where the item has been.

BACKGROUND

For many companies, one of the most important business processes is the movement of goods through a manufacturing process or supply chain/distribution network. To track the movement of goods, electronic tags may be affixed or otherwise integrated with the goods. These tags are typically in the form of a small chip and implemented using a family of technologies that facilitate the transfer of data wirelessly between tagged goods and electronic readers.

Radio frequency identification (RFID) tags are one example of such electronic tags. RFID tags have small radio antennas which are capable of transmitting data over a short range to RFID readers. In a typical RFID system, the RFID tag contains a memory chip that stores a unique identifier for a product with which it is associated. When an RFID tag passes through the range of the RFID reader, the RFID reader reads the product identifier from the memory of the RFID tag. By placing RFID readers at various locations within a supply chain/distribution network, it is possible to track the movement of the tagged items through the network by gathering the product identifiers accumulated by the various RFID readers.

SUMMARY

The present invention is directed to novel systems and methods for transmitting location event information to and/or from an electronic device, such as a radio frequency identification (RFID) tag, from and/or to one or more location ID stations.

According to one aspect of the present invention, a method comprises a steps of (a) wirelessly receiving at least one signal at an electronic device associated with a package as the package is transported from a source location to a destination location in a manufacturing process, supply chain, and/or distribution network, the at least one signal including location event information that is sufficient to specify a location of the package at a time the at least one signal is received, and (b) based upon the at least one signal, storing data representative of the location event information in memory of the electronic device so that the location of the package identified by the at least one signal can be subsequently ascertained by retrieving and analyzing the data.

According to another aspect, an apparatus is for use in a system comprising a plurality of location identification (ID) stations disposed at various locations between a source location and a destination location, each of the plurality of location ID stations being configured and arranged to wirelessly transmit at least one signal including location event information that is sufficient to specify a location of that location ID station. The apparatus comprises an electronic device comprising at least one of a radio frequency identification (RFID) tag and a sensor adapted to monitor at least one physical or environmental condition of a package with which the sensor is associated, wherein the electronic device is configured to wirelessly receive the at least one signal from each of the plurality of location ID stations and to store received location event information in memory.

According to another aspect, a system comprises an electronic device to be associated with a package when the package is transported from a source location to a destination location in a manufacturing process, supply chain, and/or distribution network, means for wirelessly transmitting at least one signal to the electronic device that includes location event information sufficient to specify a location of the package at the time the at least one signal is transmitted, and means for receiving and processing the at least one signal with the electronic device.

According to another aspect, a location identification (ID) station is for use in a system comprising a plurality of radio frequency identification (RFID) tags configured to receive signals from the location ID station and to take actions in response to receiving such signals. The location ID station comprises a transmitter portion configured and arranged to wirelessly transmit, to each of the plurality of RFID tags, at least one first signal including location event information sufficient to specify a location of the location ID station, and a receiver portion configured and arranged to wirelessly receive, from each of the plurality of RFID tags, at least one second signal comprising a unique identifier for one or more items with which that RFID tag is associated.

According to another aspect, a method comprises steps of (a) wirelessly receiving at least one signal at an electronic device associated with a package as the package is transported from a source location to a destination location, the at least one signal comprising information sufficient to specify a location of the package at a time the at least one signal is received, (b) based upon the at least one signal, storing data representative of the location in a memory of the electronic device, (c) storing a time at which the at least one signal was received in the memory of the electronic device, (d) after performing the step (c), periodically storing markers that indicate whether the package is within a vicinity of a location identification (ID) station in the memory of the electronic device, and (e) determining a duration during which the package was within the vicinity of the location based at least in part on the stored data representing the time at which the at least one signal was received and the subsequently stored markers.

DETAILED DESCRIPTION

Figure 1:
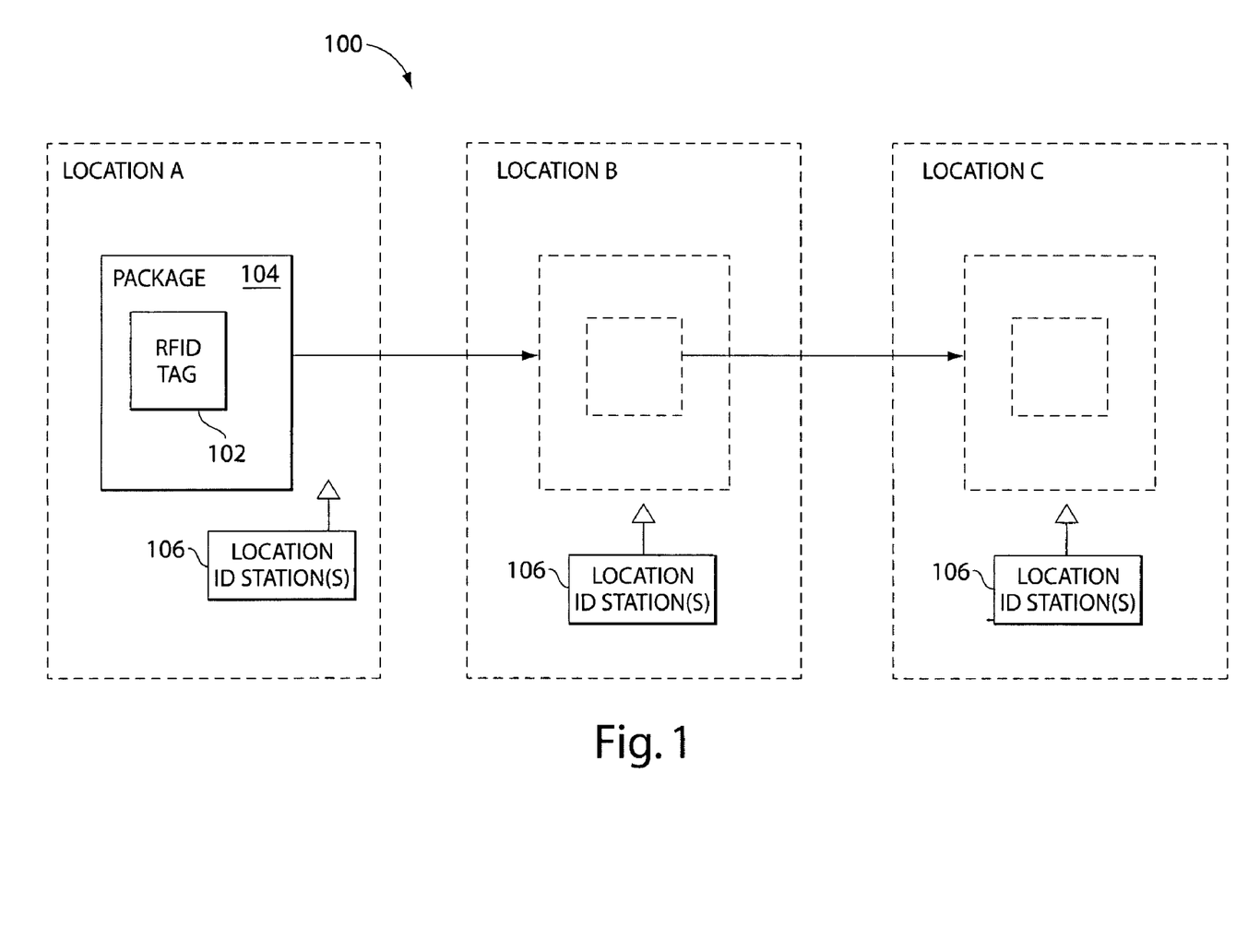
FIG. 1 shows an illustrative example of a system in which various aspects of the invention may be employed.

FIG. 1 shows an illustrative example of a system 100 in which various aspects of the present invention may be employed. As shown, a radio frequency identification (RFID) tag 102 may be attached to a package 104 that is transported from a location A to a location B, and then to a location C. The RFID tag 102 may be active (i.e., with a source of continuous power on board), or passive (i.e., which operates using energy harnessed from a received radio frequency (RF) signal), or semi passive (e.g., a continuous on-board power supply may be used in conjunction with energy harnessed from a received RF signal).

As used herein, the term "package" is intended to refer generically to any item or combination of items that can be transported from one location to another, and may, for instance, refer to a single item (i.e., the lowest level of product packaging such as a single vial, syringe, or bottle); a carton containing one or more items; a box containing one or more cartons; a pallet on which one or more boxes are placed; a trailer or shipping container containing one or more pallets, boxes or cartons; or a truck, airplane, train, ship, etc., carrying one or more trailers or shipping containers.

In the system shown, each of the locations A, B and C, includes one or more location ID stations 106 configured and arranged to communicate with the RFID tag 102 when the package 104 is within a particular range. It should be appreciated, of course, that additional or fewer locations like the locations A, B and C may be employed in alternative embodiments. In addition, multiple separate locations may be defined within any of the locations A, B and C in the example shown. For example, location B may comprise a receiving dock location, a holding or storage location, and a shipping dock location, with one or more stations 106 being disposed in each such location. As discussed below, each location ID station 106 may be incorporated into an RFID reader that is used to read information from the RFID tag 102, or may be some other device that is configured to cause information to be written into the RFID tag 102 without also reading information from it.

In addition, in some embodiments, all of the locations A, B and C need not represent fixed geographic locations. Rather, one or more of the locations A, B and C (or other locations or sub-locations) may instead represent a location on or within a moving container or vehicle. For instance, in the example shown in FIG. 1, the location B may represent a particular cargo container, airplane, railroad car, trailer, etc., that is used to transport the package 104 from a first geographic location (e.g., the location A) to a second geographic location (e.g., the location B). Thus, if the package 104 was shipped from Hong Kong to Boston, for example, one or more location ID stations 106 may be located at or within each of (A) the shipping port in Hong Kong, (B) the cargo container in which the package 104 was disposed during the shipment, and (C) the receiving port in Boston.

A location ID station 106 for a mobile location may, for example, comprise a module that can plugged into or otherwise interfaced with an existing microprocessor-based system on a vehicle, e.g., a computer on a truck, airplane, train, etc., that is used to uplink with satellites for tracking or communications purposes.

As discussed in more detail below, the RFID tag 102 may be configured such that "location event information" can be communicated to and stored in memory of the tag 102 whenever the tag 102 encounters a location ID station 106. For fixed geographic locations, this location event information may comprise, for example, a global location number (GLN) like that commonly used in advanced shipment notifications (ANS's), a global positioning system (GPS) location (longitude & latitude), or the like. For mobile locations, the location event information may comprise a unique identifier for the cargo container, trailer, railroad car, plane, etc. In some embodiments, the location event information may simply include a unique identifier for the location ID station 106, and the current "location" at which that station 106 is disposed may be ascertained from a look up table or the like.

Each piece of location event information stored in the RFID tag 102 may also reflect the time and date it was accumulated by the tag 102. In this manner, the RFID tag 102 can itself keep a record of locations at which the package 102 has been and the time and date at which it arrived at each such location. As discussed in more detail below, additional information may also be periodically stored in memory of the tag 102 when the tag remains in the vicinity of one or more location ID stations 106 at the same location. This additional information may then be used, for example, to determine how much time the package 104 spent at each separately identified location within the system 100.

The location event information so accumulated by the tag 102 may, for example, be downloaded and used for the purpose of performing statistical process analysis like that described in commonly-owned U.S. patent application Ser. No. 10/934,052, which is incorporated herein by reference in its entirety. Additionally or alternatively, such location event information may be downloaded and used to authenticate the pedigree and/or confirm the integrity of a product or its contents in the manner described in the commonly-owned U.S. patent application entitled "Pedigree and Integrity Evaluation of Packages," filed on even date herewith under U.S. patent application Ser. No. 11/112,755, and incorporated herein by reference in its entirety.

The tag 102 may communicate with the stations 106 so as to transmit location event information to the tag 102 in any of numerous ways, and the invention is not limited to any particular mode or protocol for such communication. In some embodiments in which active RFID tags are employed, for example, the tag 102 may "wake up" periodically (e.g., once every minute) and/or occasionally (e.g., whenever a particular signal is received or a particular physical condition is sensed) to "listen" to see whether it is in the proximity of a station 106. If such a station 106 is detected, then the tag 102 may effectively enter a local RF network with the station 106, and receive location event information from the station 106 via one or more network messages.

In embodiments that include passive RFID tags, communication between the RFID tags 102 and the stations 106 may be initiated after the tags 102 have entered the vicinity of a station 106 and have been energized by an RF interrogation signal from an RFID reader included in that station. During those periods when such passive tags 102 have been sufficiently energized, they may communicate with the stations 106 in their vicinity periodically, occasionally, and/or perhaps only a single time, so as to receive and store in memory location event information from such stations.

In some embodiments, the location ID stations 106 may be responsible for periodically (e.g., once every minute) and/or occasionally (e.g., in response to detected physical events, such as a truck entering a warehouse) initiating communication with any tags 102 (whether active or passive) in their vicinity so as to transfer location event information to such tags 102. Some combination of the foregoing techniques may also be employed. For example, some embodiments may include one or more stations 106 that both (1) continuously "listen" for tags that are attempting to initiate communication sessions with them, and (2) periodically or occasionally initiate communication sessions with tags 102.

Figure 2:
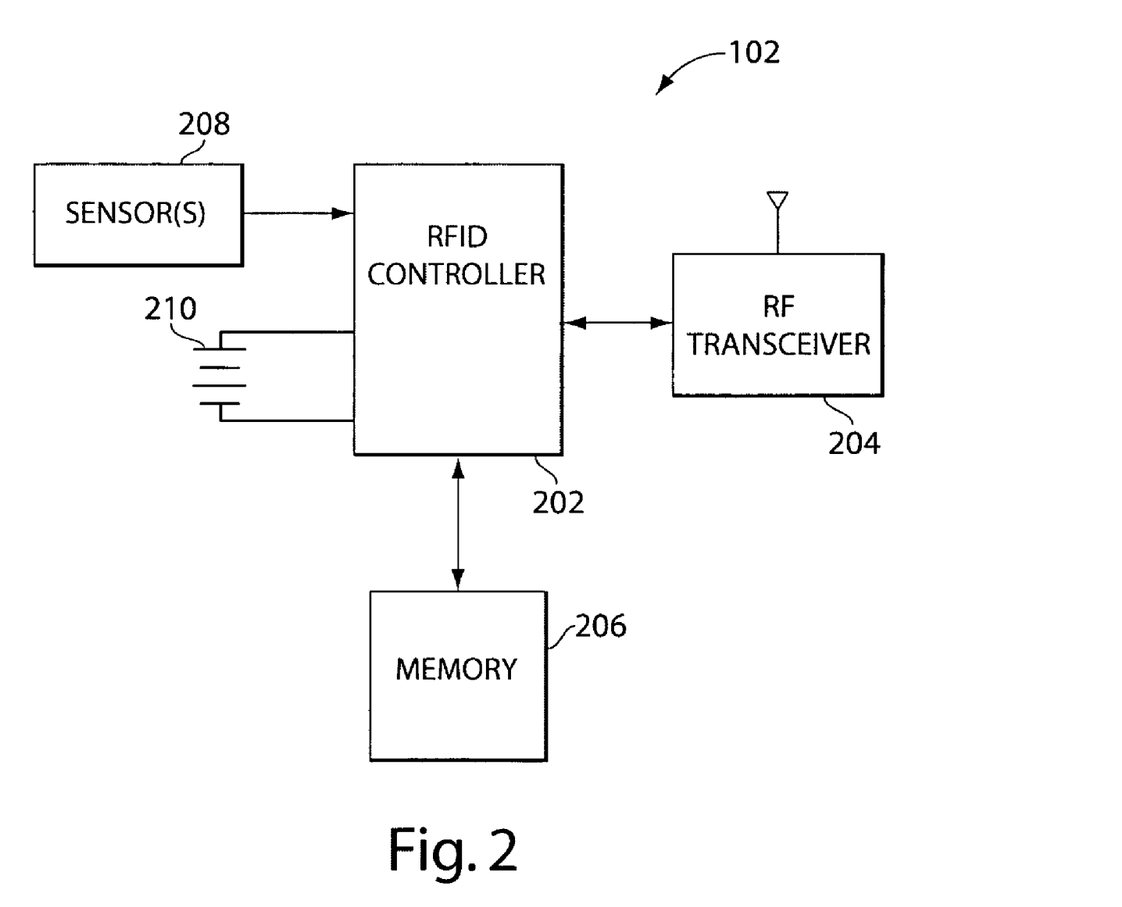
FIG. 2 shows an illustrative example of a radio frequency identification (RFID) tag that may be used to practice various aspects of the invention.

An illustrative example of an RFID tag that can be used to practice various aspects of the present invention is depicted in FIG. 2. As shown, the RFID tag 102 may comprise an RFID controller 202 and associated RF transceiver 204, as well as a memory 206 for, among other things, storing data to be transmitted to or received from other RF-enabled devices via the RF transceiver 204. In the example shown, the tag 102 further comprises one or more sensors 208 for sensing physical or environmental conditions to which the package 104 may be subjected. Examples of various types of sensors 208 that may be employed for this purpose are described in commonly-owned U.S. patent application Ser. No. 10/934,052, which is incorporated herein by reference in its entirety.

Although the RFID tag 102 in the example shown is an active tag (i.e., it includes a continuous on-board power source 210), as mentioned above, passive RFID tags may also be employed. In such tags, power would be harnessed from a received RF signal and stored in a storage capacitor or the like. As noted above, in some embodiments, tags that are both active (e.g., have an on-board battery) and configured to harness power from received RF signals may be used. The power harnessed from RF signals may, for example, supplement or recharge the on-board power supply or may provide power for certain functions of the tag 102 (such as RF communication with a nearby reader), with the battery being responsible for the other functions (such as powering a sensor circuit on the tag).

Figure 3:
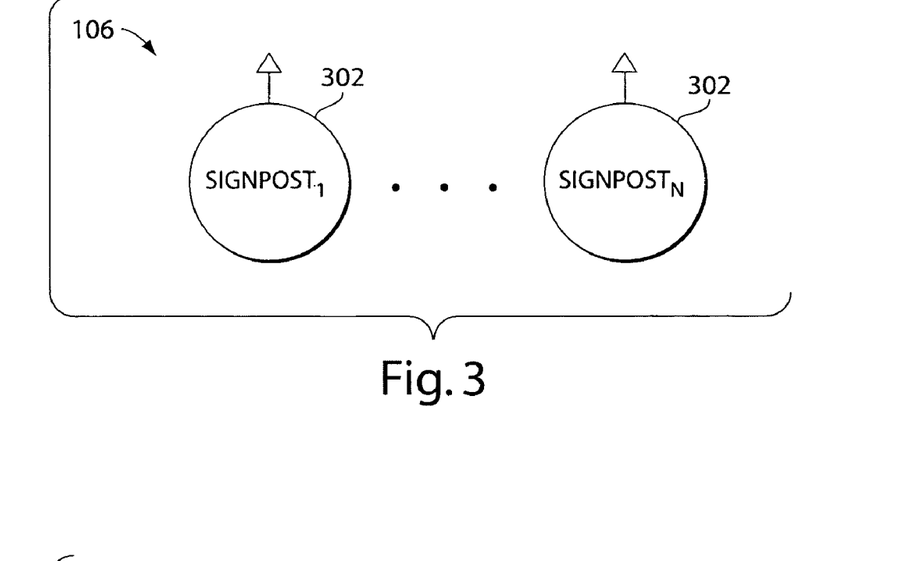
FIG. 3 shows one illustrative example of a location ID station that may be employed in various embodiments of the invention.
Figure 4:
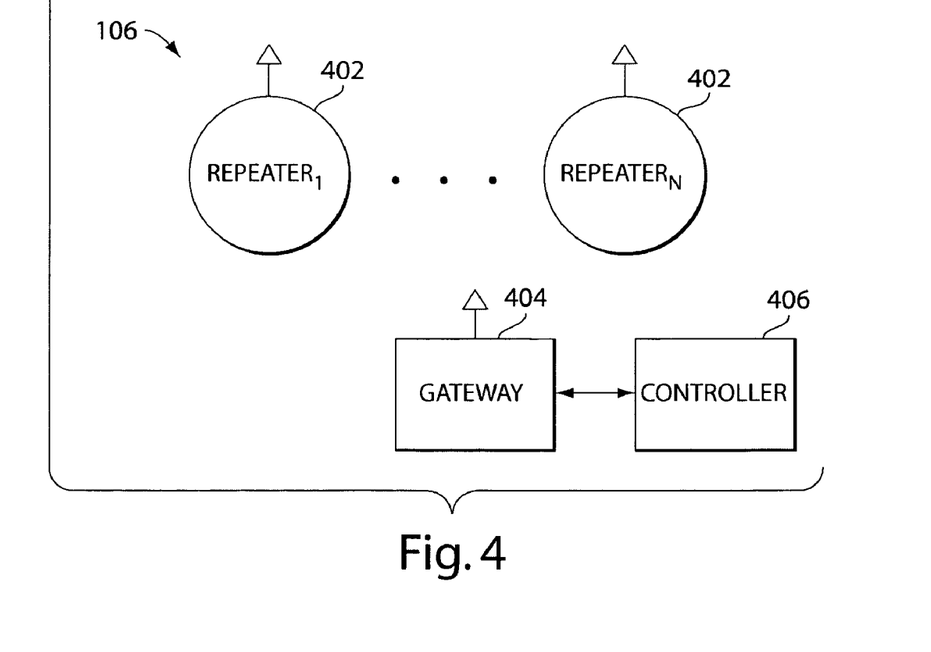
FIG. 4 shows another illustrative example of a location ID station that may be employed in various embodiments of the invention.

FIGS. 3 and 4 illustrate example embodiments of location ID stations 106 that may be employed at fixed geographic or mobile locations in various embodiments of the invention. In the example of FIG. 3, a station 106 comprises a set of "N" signposts 302, with each signpost 302 being configured to communicate appropriate location event information to the tag 102 when the tag 102 is in its vicinity. The signposts 302 may, for example, be distributed evenly throughout one of the locations A, B and C shown in FIG. 1, or throughout some sub-location thereof. The signposts 302 may, for example, be operable to communicate location event information to tags 102, but not to download any data from the tags 102.

In the example of FIG. 4, a set of "N" repeaters 402 act as a conduit between tags 102 in their vicinity and a gateway 404 coupled to a controller 406. Like the signposts 302, the repeaters 402 may be distributed evenly throughout one of the locations A, B and C shown in FIG. 1, or throughout some sub-location thereof. The gateway 404 may, for example, be configured to transmit location event information to tags 102 and also to download information from the tags 102 to the controller 406. As such, the station 106 of FIG. 4 may, for example, correspond to the "authentication appliance" described in the commonly-owned application entitled "Pedigree and Integrity Evaluation of Packages," filed on even date herewith and incorporated by reference above. In some embodiments, some or all of the repeaters 402 may be configured (by the gateway 404 or otherwise) so that they can send location event information to tags 102 autonomously, thereby taking some of the load off the gateway and controller software. When so configured, the repeaters 402 would thus behave much like the signposts 302 discussed above.

Figure 5:
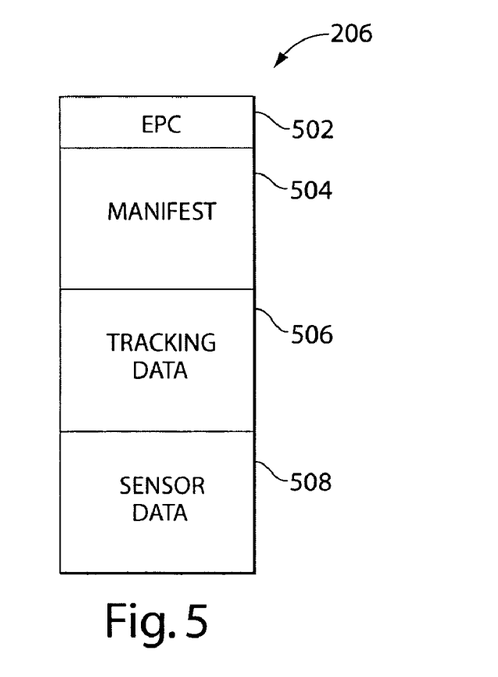
FIG. 5 shows how a memory of an RFID tag may be configured to store various pieces of information in some embodiments of the invention.

As shown in FIG. 5, the memory 206 of an RFID tag 102 may comprise several sections allocated for the storage of different information. In the example shown, the memory 206 comprises a section 502 for storing the EPC for the package 104, a section 504 for storing manifest information (e.g., data contained in an ANS or the like) for the package 104, a section 506 for storing tracking data (e.g., location event information received from location ID stations 106), and a section 508 for storing data accumulated by the sensor(s) 208. It should be appreciated, of course, that in alternative embodiments additional or fewer sections than those illustrated may be employed. For example, in some embodiments, the memory 206 may include only the EPC section 502 and the tracking data section 506.

Figure 6:
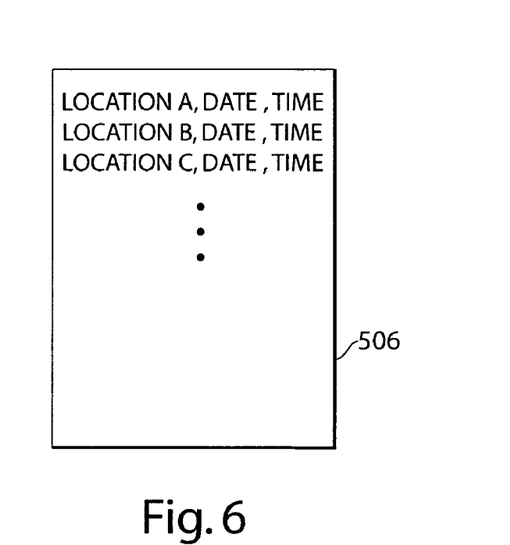
FIG. 6 shows examples of tracking data that may be stored in a memory of an RFID tag in some embodiments of the invention.

As shown in FIG. 6, each entry in the tracking data section 506 of the memory 206 may comprise information identifying the location of the station 106 providing the information as well as the date and time such information was received from that station 106. As noted above, the location of the station 106 may be identified using some sort of unique identifier to specify its fixed geographic location (e.g., a GLN or the like) or its mobile location (e.g., an identifier that specifies a particular cargo container, trailer, railroad car, airplane, etc., with which it is associated).

It should be appreciated that the time and/or date information described above and shown in FIG. 6 need not be received from the station 106. Additionally or alternatively, the tag 102 may include a clock that generates time information. The clock may enable the tag 102 to determine the time and/or date that the information identifying the location of the station 106 was received without receiving this information from an external source. The clock may provide real-time information. For example, the clock may initially be set according to a standard time (e.g., Greenwich Mean Time), and may thereafter approximate the standard time.

If the RFID tag 102 is within the vicinity of the station 106 for an extended period of time, multiple entries may be made in the tracking data section 506 of the memory 206 identifying the location of the station 106. Alternatively, to conserve space in the memory 206, the RFID tag 102 may be configured to store no more than a predetermined number of consecutive entries (e.g., one or two) identifying the location of a particular station (e.g., station 106).

Figure 7:
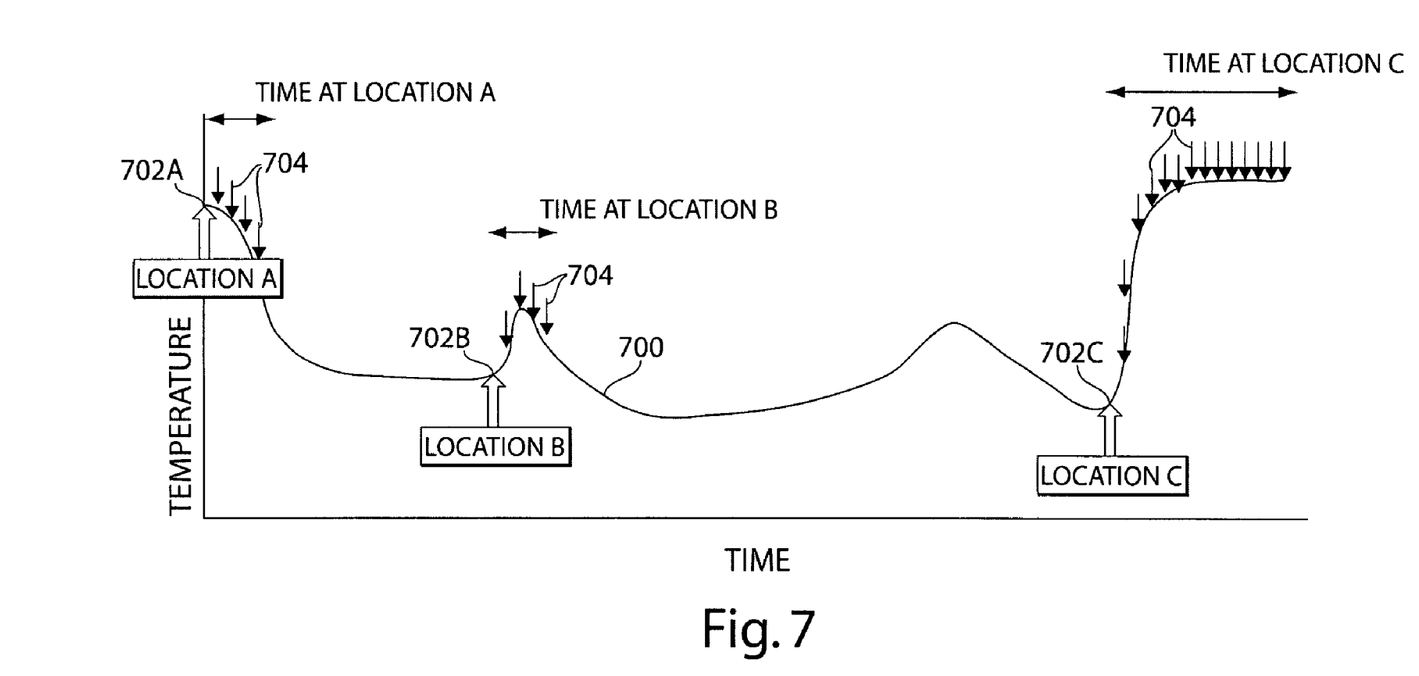
FIG. 7 is a graph illustrating how location event information and temperature information may be recorded in a memory of an RFID tag in some embodiments of the invention.

FIG. 7 is a graph illustrating an example of how location event information and temperature data might both be recorded by a tag 102 (which includes a temperature sensor 208) as a package 104 is moved from location A to location C of FIG. 1. It should be appreciated, of course, that this same technique may also be applied with any other type of sensor 208. In the graph, the curve 700 represents the temperature sensed by a sensor 208 associated with the package 104 as a function of time. A temperature reading might be recorded, for example, once every fifteen minutes, with data concerning such readings being stored in the section 508 of the memory 206 in the tag 102. To conserve power, the tag may be configured to "wake up" periodically (e.g., once every fifteen minutes) to record such a reading.

The points 702A-C in the graph of FIG. 7 represent times at which the tag 102 first entered the vicinity of the stations(s) 106 in the locations A-C, respectively. As noted above, the tag 102 may wake up periodically (e.g., once every minute) to determine whether it is in the vicinity of a station 106, in which case the points 702A-C would represent the time at which the tag first woke up after entering the location. When the tag 102 first determines that it is in the vicinity of a station 106, it can communicate with the station 106 to retrieve location event information from it, and store such information in the section 506 of the memory 206. Thereafter, each time the tag wakes up and is still in the vicinity of the same station 106 (or another station 106 in the same location), it can simply set a marker (e.g., a bit) to be included in the next recorded temperature reading. In FIG. 7, the times at which such markers were included with the recorded temperature readings are represented by the arrows 704. Thus, by counting the number of temperature readings including markers 704 that follow the recording of location event information 702 A-C, the length of time the package 104 spent at each of the locations A, B, and C can be determined with a reasonable degree of accuracy.

In some embodiments, only two location events may be stored for each location A, B, and C that is encountered by the tag 102. For instance, the tag 102 may record an "entry event" each time the tag 102 enters a new location, and may also record a "departure event" each time it is determined that the tag 102 has left a location. After the tag 102 has entered a particular location and recorded an "entry event," it may, for example, periodically or continuously check to see whether the network at that location is still there. When it determines that the network is no longer there, or has not been there for some period of time, the tag 102 may then autonomously record a "departure event" in its memory.

It should be appreciated, of course, that it is not necessary to store location event information together with information accumulated by sensor(s) 208. In some embodiments, for example, it may be desirable to store only location event information in the memory 206 of an RFID tag 102. Such embodiments may find applications, for example, in connection with systems that are designed to enhance homeland security, or are designed to track the distribution chains of certain pharmaceuticals, etc. Indeed, the storage of information in the tag 102 that is sufficient to account for the location (geographic and mobile) of a product at all times during its distribution may find application in any situation where it is desirable to know where a product has been and the amount of time it spent at various locations along its route. It may, for example, be desirable to determine whether a package followed its intended route, whether it was carried by the proper vehicles or containers as it made its way along that route, and/or whether it followed such a route according to a scheduled timetable. If a package 104 appears to have been misdirected or delayed excessively, or there are significant periods of time for which location event information was not recorded when it should have been, appropriate precautions and/or remedial or investigatory measures may be taken.

Whether or not location event information is stored together with sensor data (as discussed above in connection with FIG. 7), when a package 104 remains at a particular location for an extended period of time, it is not necessary to store a unique identifier for the same location in memory more than once. Instead, an abbreviated amount of information (even a single bit) may be periodically or occasionally stored in memory (e.g., every ten minutes) after the unique identifier for the location has been stored a first time. Because that abbreviated information will be sufficient to indicate that the package remained in the vicinity of the same location ID station 106 (or group of stations at the same location), the full unique identifier need not be stored and space in the tag's memory can thus be conserved.

Figure 8:
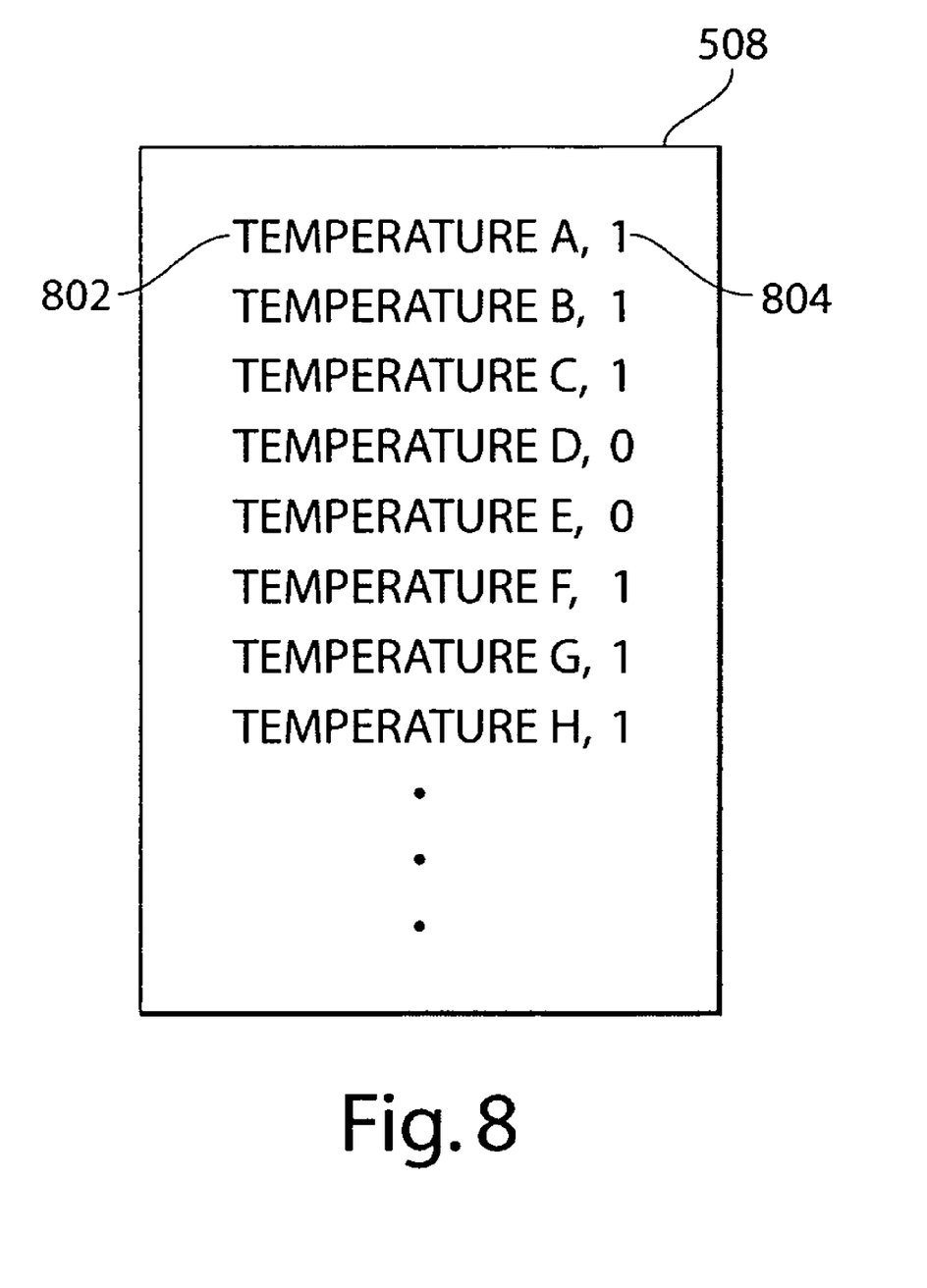
FIG. 8 shows examples of sensor data and location markers that may be stored in a memory of an RFID tag in some embodiments of the invention.

As discussed above in connection with FIG. 7, a temperature reading and a marker may be stored in the section 508 of the memory 206 at known intervals, for example, each time the tag 102 wakes up. FIG. 8 illustrates an example of how this information may be stored in the section 508 of memory 206 illustrated in FIG. 5. As shown, each temperature reading 802 may be associated with a marker 804 that indicates whether or not the tag 102 is within the vicinity of a location ID station. In the example of FIG. 8, we assume that storing a marker 804 as "1" designates that the tag 102 is in the vicinity of a station, and that storing a marker 804 as a "0" designates that the tag 102 is not in the vicinity of a station. Based on these marker designations, the entries stored in the section 508 of memory as shown in FIG. 8 indicate that the tag 102 was within the vicinity of a location ID station when Temperatures A, B, C, F, G, and H were recorded and was not in the vicinity of a station when Temperatures D and E were recorded. As previously, discussed, by comparing this information to stored location event information, such as that stored in section 506 of the memory 206 (see FIG. 6), the number of times that the tag 102 stored a marker indicating that the tag 102 was in the vicinity of a station may be determined for each corresponding location. Given the known interval at which the marker 804 was stored, this number may be translated into a length of time that the tag 102 spent at each location.

It should be appreciated that the determination of the length of time that tag 102 spent at each location may be determined by a computer external to the tag based on the location event information and marker information discussed above. Further, it should be appreciated that while the marker information is shown in FIG. 8 as being stored in section 508 of memory, this information may be stored elsewhere, and/or need not be associated with temperature data or other sensor data.

In some embodiments, the tag 102 may be configured such that some aspect of its behavior or operation is dependent upon the location event information that has been written into its memory. The tag 102 may, for example, be programmed so that it does not record temperature data from a sensor 208 when location event information it has received indicates that the tag 102 is in a "trusted" refrigerator whose temperature is strictly controlled and monitored, but does record temperature data when received location event information indicates that it is in some other location. Additionally or alternatively, the tag 102 may modify the sampling interval of its sensor(s) 208, or perhaps turn itself off for a period of time, in response the location event information that it receives.

In some embodiments, tags 102 may also be designed so that some aspect of their behavior or functionality is "configurable" or "programmable." For instance, particular "personality" information may be stored in the memory of the tag 102, or physical switches or jumper wires or the like may be configured on the tag, that dictate the tag's behavior. For example, the manner in which the tag 102 responds to the receipt of particular location event information (e.g., as discussed in the preceding paragraph) may be determined based upon the "personality" with which that tag 102 has been configured. The identity of all locations at which it is unnecessary to record sensor data may, for example, be stored in memory of the tag 102, so that the tag 102 may appropriately halt its recording of sensor data when the tag receives location event information indicating it is in one of the specified locations.

Having thus described at least one illustrative embodiment of the invention, various alterations, modifications and improvements will readily occur to those skilled in the art. Such alterations, modifications and improvements are intended to be within the spirit and scope of the invention. Accordingly, the foregoing description is by way of example only and is not intended as limiting. The invention is limited only as defined in the following claims and the equivalents thereto.

What is claimed is:

1. A method, comprising steps of:
   (a) wirelessly receiving at least one signal at an electronic device associated with a package as the package is transported from a source location to a destination location in a manufacturing process, supply chain, and/or distribution network, the at least one signal including location event information that is sufficient to specify a location of the package at a time the at least one signal is received; and
   (b) based upon the at least one signal, storing data representative of the location event information in memory of the electronic device so that the location of the package identified by the at least one signal can be subsequently ascertained by retrieving and analyzing the data;
   wherein the step (b) comprises storing data in the memory of the electronic device sufficient to indicate an amount of time the package spent at the specified location.

2. The method of claim 1, further comprising a step of:
   (c) transporting the package from the source location to the destination location.

3. The method of claim 2, further comprising a step of:
   (d) repeating the steps (a) and (b) during the performance of the step (c).

4. The method of claim 1, further comprising a step of storing in the memory of the electronic device data concerning at least one physical or environmental condition to which the package is subjected, wherein the data is accumulated as the package is transported from the source location to the destination location.

5. The method of claim 4, wherein the at least one physical or environmental condition comprises a temperature condition.

6. The method of claim 1, wherein the step (b) further comprises storing data in the memory of the electronic device that is sufficient to specify the current geographic location of the package at the time the at least one signal was received.

7. The method of claim 1, wherein the step (b) further comprises storing data in the memory of the electronic device that is sufficient to specify the identity of a mobile apparatus that was holding the package at the time the at least one signal was received.

8. The method of claim 1, wherein the step (b) further comprises storing data in the memory of the electronic device that is sufficient to specify the date on which the at least one signal was received.

9. The method of claim 1, wherein the step (b) further comprises storing data in the memory of the electronic device that is sufficient to specify the time of day at which the at least one signal was received.

10. The method of claim 1, wherein the electronic device comprises a radio frequency identification (RFID) tag.

11. The method of claim 1, wherein data stored in step (b) is used for performing a statistical process analysis.

12. The method of claim 1, wherein data stored in step (b) is used to confirm the integrity of the package or its contents.

13. An apparatus for use in a system comprising a plurality of location identification (ID) stations disposed at various locations between a source location and a destination location, each of the plurality of location ID stations being configured and arranged to wirelessly transmit at least one signal including location event information that is sufficient to specify a location of that location ID station, the apparatus comprising:
   a radio frequency identification (RFID) tag associated with a package, the RFID tag comprising a sensor adapted to monitor at least one physical or environmental condition to which the package is subjected, wherein the RFID tag is configured to wirelessly receive the at least one signal from each of the plurality of location ID stations and to store received location event information in memory.

14. The apparatus of claim 13, wherein the RFID tag is further configured to store received location event information in a portion of the memory allocated for storing location event information.

15. The apparatus of claim 14, wherein the memory further comprises a portion allocated for storing an electronic product code (EPC).

16. The apparatus of claim 14, wherein the memory further comprises a portion allocated for storing manifest information.

17. The apparatus of claim 14, wherein the memory further comprises a portion allocated for storing sensor data.

18. The apparatus of claim 13, wherein the RFID tag comprises means for receiving the at least one signal from the plurality of location ID stations and means for storing the received location event information in the memory.

19. The apparatus of claim 13, wherein the location event information included in at least some of the signals is sufficient to specify the identities of mobile apparatuses with which those location ID stations are associated.

20. The apparatus of claim 13, wherein the location event information in included at least some of the signals is sufficient to specify the date on which each such signal was transmitted.

21. The apparatus of claim 13, wherein the location event information included in at least some of the signals is sufficient to specify the time of day at which each such signal was transmitted.

22. The apparatus of claim 13, in combination with the plurality of location ID stations.

23. The apparatus of claim 13, wherein the electronic device comprises a real-time clock.

24. The apparatus of claim 13, wherein the sensor is a temperature sensor.

25. The apparatus of claim 13, wherein the sensor is physically coupled to the memory.

26. An apparatus for use in a system comprising a plurality of location identification (ID) stations disposed at various locations between a source location and a destination location, each of the plurality of location ID stations being configured and arranged to wirelessly transmit at least one signal including location event information that is sufficient to specify a location of that location ID station, the apparatus comprising:
   an electronic device comprising at least one of a radio frequency identification (RFID) tag and a sensor adapted to monitor at least one physical or environmental condition of a package with which the sensor is associated, wherein the electronic device is configured to wirelessly receive the at least one signal from each of the plurality of location ID stations and to store received location event information in memory;

wherein the electronic device is configured to store received location event information in the memory only if a predetermined number of consecutive entries in the memory specifying the same current geographic location has not been exceeded.

27. An apparatus for use in a system comprising a plurality of location identification (ID) stations disposed at various locations between a source location and a destination location, each of the plurality of location ID stations being configured and arranged to wirelessly transmit at least one signal including location event information that is sufficient to specify a location of that location ID station, the apparatus comprising:

an electronic device comprising at least one of a radio frequency identification (RFID) tag and a sensor adapted to monitor at least one physical or environmental condition of a package with which the sensor is associated, wherein the electronic device is configured to wirelessly receive the at least one signal from each of the plurality of location ID stations and to store received location event information in memory, wherein the location event information included in received signals is sufficient to indicate an amount of time the package spent at each location.

28. The apparatus of claim 27, wherein the electronic device comprises the RFID tag.

29. The apparatus of claim 27, wherein the electronic device comprises the sensor.

30. A system, comprising:

an electronic device to be associated with a package when the package is transported from a source location to a destination location in a manufacturing process, supply chain, and/or distribution network;

means for wirelessly transmitting at least one signal to the electronic device that includes location event information sufficient to specify a location of the package at the time the at least one signal is transmitted; and means for receiving the at least one signal with the electronic device and, in response to receiving the at least one signal, storing information indicating the location of the package together with time information.

31. The system of claim 30, wherein the at least one signal comprises data sufficient to specify the current geographic location of the package at the time the at least one signal is transmitted.

32. The system of claim 30, wherein the at least one signal comprises data sufficient to specify the identity of a mobile apparatus that is holding the package at the time the at least one signal is transmitted.

33. The system of claim 30, wherein the at least one signal comprises data sufficient to specify the date on which the at least one signal is transmitted.

34. The system of claim 30, wherein the at least one signal comprises data sufficient to specify the time of day at which the at least one signal is transmitted.

35. The system of claim 30, wherein the electronic device comprises a radio frequency identification (RFID) tag.

36. The system of claim 30, further comprising means for accumulating and storing in a memory of the electronic device data concerning at least one physical or environmental condition to which the package is subjected.

37. The system of claim 32, wherein the at least one physical or environmental condition comprises a temperature condition.

38. The system of claim 30, wherein the at least one signal comprises data sufficient to indicate an amount of time the package spent at the specified location.

39. The system of claim 30, wherein the electronic device comprises a real-time clock.

40. A method, comprising steps of:
(a) wirelessly receiving at least one signal at an electronic device associated with a package as the package is transported from a source location to a destination location, the at least one signal comprising information sufficient to specify a location of the package at a time the at least one signal is received;
(b) based upon the at least one signal, storing data representative of the location in a memory of the electronic device;
(c) storing data representing a time at which the at least one signal was received in the memory of the electronic device;
(d) after performing the step (c), periodically storing markers that indicate whether the package is within a vicinity of a location identification (ID) station in the memory of the electronic device; and
(e) determining a duration during which the package was within the vicinity of the location based at least in part on the stored data representing the time at which the at least one signal was received and the subsequently stored markers.

41. The method of claim 40, wherein the duration determined in step (e) is approximate.

* * * * *